United States Patent [19]

Saito et al.

[11] Patent Number: 4,820,761
[45] Date of Patent: Apr. 11, 1989

[54] AROMATIC POLYSULFONE RESIN COMPOSITION

[75] Inventors: Teruo Saito, Kusatsu; Haruo Hayashida, Osaka; Kazuo Hieda, Nishinomiya, all of Japan

[73] Assignee: Sumitomo Chemical Company, Limited, Osaka, Japan

[21] Appl. No.: 217,139

[22] Filed: Jul. 5, 1988

Related U.S. Application Data

[63] Continuation of Ser. No. 629,910, Jul. 11, 1984, abandoned.

[30] Foreign Application Priority Data

Jul. 19, 1983 [JP] Japan ................... 58-132571

[51] Int. Cl.$^4$ ................................ C08K 3/34
[52] U.S. Cl. ..................... 524/456; 524/502; 524/508; 523/212; 523/216
[58] Field of Search ............ 524/456, 502, 508

[56] References Cited

U.S. PATENT DOCUMENTS

| | | | |
|---|---|---|---|
| Re. 31,448 | 11/1983 | Attwood et al. | 525/150 |
| 3,400,065 | 9/1968 | Barth | 204/159.2 |
| 3,755,256 | 8/1973 | Beverly | 524/609 |
| 3,992,347 | 11/1976 | Vary | 524/500 |
| 3,993,843 | 11/1976 | Vasta | 525/150 |
| 4,008,203 | 2/1977 | Jones | 524/609 |
| 4,049,627 | 9/1977 | Anderson | 524/609 |
| 4,131,711 | 12/1978 | Attwood | 525/150 |
| 4,169,117 | 9/1979 | Vasta | 525/150 |
| 4,355,059 | 10/1982 | Blackwell | 525/189 |

FOREIGN PATENT DOCUMENTS

| | | | |
|---|---|---|---|
| 2531404 | 2/1976 | Fed. Rep. of Germany . | |
| 2800609 | 7/1979 | Fed. Rep. of Germany | 525/189 |
| 58-160346 | 9/1983 | Japan | 524/508 |
| 58-179262 | 10/1983 | Japan | 524/508 |
| 747867 | 7/1980 | U.S.S.R. . | |
| 1311311 | 3/1973 | United Kingdom . | |

Primary Examiner—Lewis T. Jacobs
Attorney, Agent, or Firm—Stevens, Davis, Miller & Mosher

[57] ABSTRACT

An aromatic polysulfone resin composition comprising 20 to 80% by weight of an aromatic polysulfone, 10 to 70% by weight of wallastonite and 0.5 to 20% by weight of a fluororesin. The aromatic polysulfone resin composition is superior in heat resistance, strength, stiffness, flame resistance, processability, etc. as engineering plastics.

8 Claims, No Drawings

AROMATIC POLYSULFONE RESIN COMPOSITION

This application is a continuation of application Ser. No. 629,910, filed July 11, 1984, now abandoned.

BACKGROUND OF THE INVENTION

1. Field of the Invention

This invention relates to an aromatic polysulfone resin composition exhibiting high heat resistance, superior mechanical properties, low mold shrinkage, and good mold releasability.

2. Description of the Prior Art

Aromatic polysulfone resins are noticed as engineering plastics superior in heat resistance, strength, stiffness, flame resistance, chemical resistance, processability, etc., particularly in the fields of applications to electric parts and automotive parts.

In these application fields, however, there is a growing need, with technical progress in these fields, for an aromatic polysulfone resin composition having higher heat resistance, stiffness, and dimensional accuracy (low mold shrinkage) while maintaining the flame resistance, chemical resistance, hot water resistance, and processability which are merits of this resin.

It is known that the heat resistance, stiffness, and dimensional accuracy of resins are improved, as a rule, by incorporating thereinto a fibrous reinforcement such as glass fiber, carbon fiber, or the like or an inorganic filler in powdery acicular, or flaky form, such as talc, calcium carbonate, magnesium carbonate, calcium sulfite, aluminum hydroxide, mica, molybdenum disulfide, wollastonite, graphite, titanium white, or glass beads.

Also when aromatic polysulfone resin is compounded with such a reinforcement or filler, improvements in the heat resistance and stiffness and a decrease in the mold shrinkage are observed responsively to the quantity of the reinforcement or filler blended.

With the increase of quantity of the reinforcement or filler blended, the mold shrinkage decreases and the mold fidelity in injection molding and in similar molding becomes better; but the mold releasability in injection molding lowers and the take-off of the molded article from the mold cavity becomes difficult. In consequence, excess stress is exerted on the molded article when it is ejected from the cavity; this leaves strain in the molded article and may cause troubles such as the deformation of the molded article at the time of the ejection and the stress cracking and eventual break of the finished article.

Accordingly, in spite of the strong request for a resin composition exhibiting low mold shrinkage and excellent mold fidelity and dimensional accuracy, the quantity of the reinforcement or filler to be blended is usually restricted so as to hold the reduction of the mold shrinkage in such a degree that none of the above problems arise in the operation of releasing the molded article from the mold cavity.

In view of the above, the present inventors made intensive studies, and as a result, found that a resin composition which has high heat resistance, stiffness, and strength and exhibits low mold shrinkage and good mold releasability can be obtained by compounding an aromatic polysulfone with a fibrous reinforcement or an inorganic filler and additionally with a specified amount of a fluororesin. Based on this finding, this invention has been accomplished.

SUMMARY OF THE INVENTION

An object of the present invention is to provide an aromatic polysulfone resin composition excellent in processability as well as in heat resistance, stiffness, and strength.

Other objects and advantages of the present invention will be apparent from the following description.

According to the present invention, there is provided an aromatic polysulfone resin composition which comprises 20 to 80% by weight of an aromatic polysulfone, 10 to 70% by weight of a fibrous reinforcement or an inorganic filler, and 0.5 to 20% by weight of a fluororesin.

DETAILED DESCRIPTION OF THE INVENTION

The aromatic polysulfone to be used as a component of the composition of this invention is defined as a polyarylene compound in which arylene units together with ether linkages and with sulfone linkages are arranged orderly or disorderly. Polymers of the following structures (1)–(16) are given as examples of the aromatic polysulfone. Of these polymers, particularly preferred are those of the structures (1), (2), and (6) in that physical properties and processability thereof are well balanced.

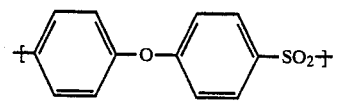

(1)

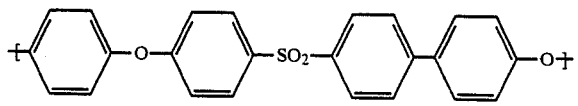

(2)

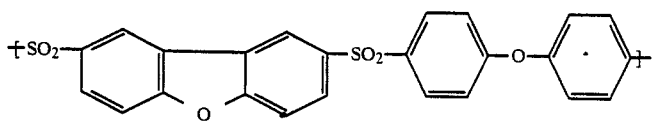

(3)

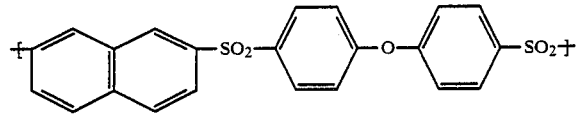
(4)
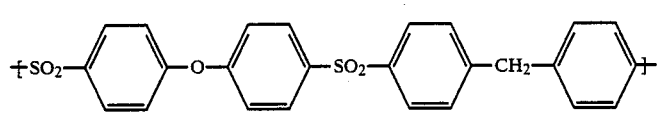
(5)
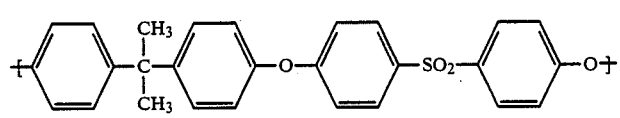
(6)
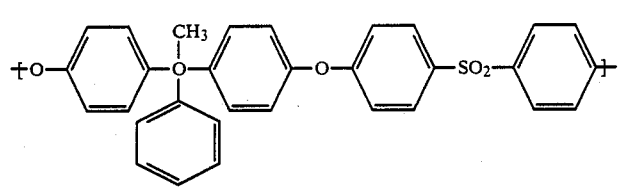
(7)
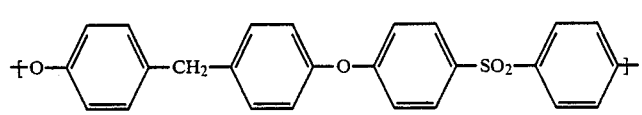
(8)
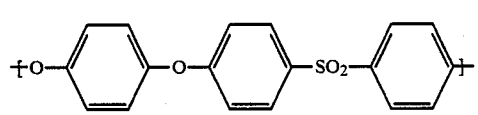
(9)
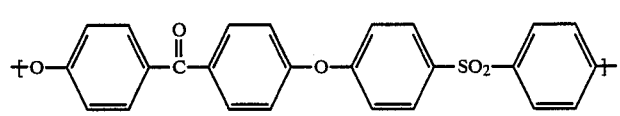
(10)
(11)
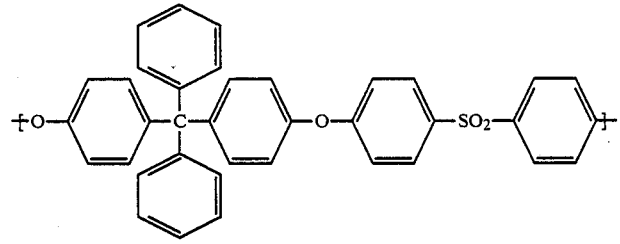
(12)
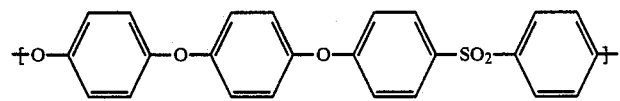
(13)
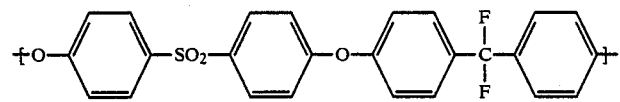
(14)
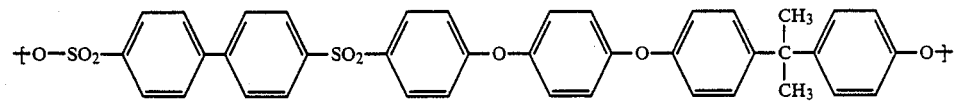
(15)
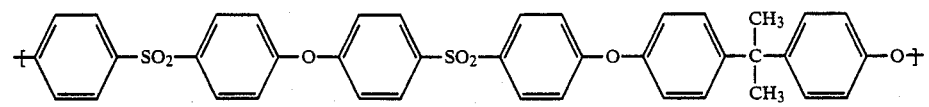

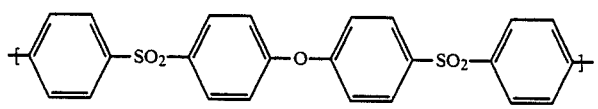

Further, the aromatic polysulfones exhibiting a reduced viscosity of 0.3–0.6, as determined at 25° C. on a 1 W/V % solution of the polymer in dimethylformamide, are best suited because these are excellent in the balance of physical properties such as heat resistance, stiffness, and strength with processability.

Examples of the fibrous reinforcement used as another component of the composition of this invention are glass fiber, carbon fiber, aromatic polyamide fiber, silicon carbide fiber, silicon nitride fiber, alumina fiber, potassium titanate fiber, and other mineral fibers reinforcements generally used for improving the heat resistance, strength, stiffness, etc. of resins.

Examples of the inorganic filler used as another component of the composition of this invention are talc, calcium carbonate, magnesium carbonate, calcium sulfite, aluminum hydroxide, mica, molybdenum disulfide, wollastonite, graphite, titanium white, glass beads, zirconia, and silica.

These fibrous reinforcements and inorganic fillers can be used normally as such without any treatment, but also used after treatment thereof with a silane coupling agent such as an aminosilane or an epoxysilane or with chromic chloride for the purpose of enhancing the affinity for the aromatic polysulfone, or with other surface treating agents which meet individual purposes.

The fluororesin used as another component of the composition of this invention is a macromolecular compound containing fluorine atoms in the molecule. Examples thereof are tetrafluoroethylene resin, tetrafluoroethylene-perchloroalkyl vinyl ether copolymer resin, tetrafluoroethylene-hexafluoropropylene copolymer resin, tetrafluoroethylene-ethylene copolymer resin, chlorotrifluoroethylene resin, and vinylidene fluoride resin.

Of these fluororesins, tetrafluoroethylene resin (polytetrafluoroethylene) is preferable for the following reason: This polymer has a high melt viscosity and hence hardly flows even when heated to temperatures above its melting point (about 330° C.). Therefore its state of dispersion in the aromatic polysulfone is little altered under the usual conditions of molding the resin composition, so that characteristics, mechanical strengths, and mold releasability in injection molding, of the composition are scarcely varied by molding.

Suitable blending proportions of these components of the composition are 20 to 80% by weight of the aromatic polysulfone, 10 to 70% by weight of the fibrous reinforcement or inorganic filler, and 0.5 to 20% by weight of the fluororesin, based on the total weight of the composition, wherein the combined proportion of the fibrous reinforcement or inorganic filler with the fluororesin is desired to be in the range of 20 to 80% by weight.

When the combined proportion of the reinforcement or filler with fluororesin is more than 80% by weight and the proportion of the aromatic polysulfone is less than 20% by weight, sufficient mixing of the components is unattainable and the resulting composition is hence nonuniform, loses fluidity, and is difficult to mold. When the combined proportion of the reinforcement or filler with the fluororesin is less than 20% by weight, the sufficient effect of lowering mold shrinkage cannot be obtained.

When the proportion of the reinforcement or filler is less than 10% by weight, the effect of lowering mold shrinkage is insufficient even if the combined proportion of the reinforcement or filler with the fluororesin is 20 to 80% by weight. On the other hand, when the proportion of the fluororesin is less than 0.5% by weight, the mold releasability in injection molding is insufficient.

When the proportion of the reinforcement or filler exceeds 70% by weight, the compounding becomes difficult and insufficient, giving a nonuniform composition. When the proportion of the fluororesin exceeds 20% by weight, the strength of the resulting composition remarkably lowers.

The blending method for the composition of this invention is not particularly restricted. The aromatic polysulfone, the fibrous reinforcement or inorganic filler, and the fluororesin can be fed separately into a melt mixer or may be mixed in a mortar, Henschel mixer, ball mill, ribbon blender, or the like prior to the feeding into a melt mixer.

One or more usual additives can be incorporated into the composition of this invention unless departing from the object of the invention. Such additives include antioxydants, heat stabilizers, ultraviolet absorbers, lubricants, mold releasing agents, colorants such as dyes and pigments, flame retardants, auxiliary flame retardants, antistatics, etc.

The invention is illustrated in more detail with reference to the following examples; however, these examples are intended not to restrict the invention but to give preferred embodiments thereof.

EXAMPLES 1 TO 5

A polyethersulfone having the basic structure

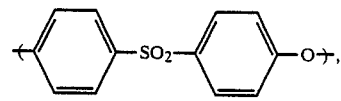

(the reduced viscosity was 0.4, as determined at 25° C. on a 1 W/V % solution of the polymer in dimethylformamide), wollastonite (CaSiO3 in acicular form, supplied by Nagase & Company, Ltd. under the tradename of NYAD-G), and tetrafluoroethylene resin (supplied by Imperial Chemical Industries Ltd. under the tradename of Fluon L 169) were mixed in proportions as shown in Table 1. The mixture was melted and mixed at 340° C. by using a twin-screw extruder (PCM-30, supplied by Ikegai Corporation). The resulting strands were cold and cut into pellets.

Pellets thus obtained were injection-molded (Sumitomo-Nestal 47/28 injection molding machine, cylinder temperature 360° C., mold temperature 130° C.) into bending test specimens. After the mold was opened, the resistance against the ejection of each molded part with the ejector pin was measured by using a strain gage type of pressure sensor.

These bending test specimens were measured for flexural strength, flexural modulus, heat deflection temperature, and mold shrinkage. The flexural strength and the heat deflection temperature were determined in accordance with ASTM D-790 and ASTM D-648 (18.6 Kg/cm$^2$), respectively. The results were summarized in Table 1.

COMPARATIVE EXAMPLES 1 TO 5

The same polyethersulfone, wollastonite, and tetrafluoroethylene resin as used in Examples 1 to 5 were mixed in proportions as shown in Table 1, and molded and tested for physical properties in the same manner as in Examples 1 to 5. The results are summarized in Table 1.

EXAMPLES 6 TO 10

A polysulfone having the basic structure

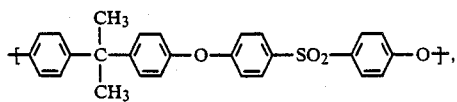

(the reduced viscosity was 0.38, as determined at 25° C. on a 1 W/V % solution of the polymer in dimethylformamide), glass fiber (REV-8, supplied by Nihon Sheet Glass Co., Ltd.), and tetrafluoroethylene resin (supplied by Daikin Industries, Ltd. under the tradename of Lubron L-5) were mixed in proportions as shown in Table 2. The mixture was melted and mixed at 320° C. by using a twin-screw extruder (PCM-30, supplied by Ikegai Corporation). The resulting strands were cooled with water and cut into pellets.

Pellets thus obtained were injection-molded (Sumitomo-Nestal 47/28 injection molding machine, cylinder temperature 340° C., mold temperature 110° C.) into bending test specimens. The resistance against the ejection, flexural strength, flexural modulus, heat deflection temperature, and mold shrinkage were measured in the same manner as in Examples 1 to 5. The results are summarized in Table 2.

COMPARATIVE EXAMPLES 6 TO 10

The same polysulfone, glass fiber and tetrafluoroethylene resin as used in Examples 6 to 10 were mixed in proportions as shown in Table 2 and molded and tested for physical properties in the same manner as in Examples 6 to 10. The results are summarized in Table 2.

TABLE 1

| | Composition | | | Resistance against ejection of injection-molded article (Kg/cm$^2$) | Mold shrinkage (%) | Flexural strength (kg/cm$^2$) | Flexural modulus (kg/cm$^2$) | Heat deflection temperature (°C.) |
|---|---|---|---|---|---|---|---|---|
| | Polyethersulfone | Wollastonite | Fluororesin | | | | | |
| Example 1 | 40 | 55 | 5 | 130 | 0.1 | 1100 | 120,000 | 215 |
| Example 2 | 50 | 45 | 5 | 100 | 0.2 | 1200 | 101,000 | 213 |
| Example 3 | 70 | 25 | 5 | 80 | 0.3 | 1300 | 85,000 | 210 |
| Example 4 | 50 | 49 | 1 | 105 | 0.2 | 1250 | 110,000 | 215 |
| Example 5 | 50 | 40 | 10 | 95 | 0.2 | 1150 | 90,000 | 212 |
| Comparative Example 1 | 100 | 0 | 0 | 250 | 0.7 | 1300 | 26,500 | 203 |
| Comparative Example 2 | 90 | 5 | 5 | 65 | 0.6 | 1300 | 27,000 | 205 |
| Comparative Example 3 | 10 | 85 | 5 | | | Molding was infeasible | | |
| Comparative Example 4 | 50 | 20 | 30 | 70 | 0.5 | 650 | 65,000 | 210 |
| Comparative Example 5 | 50 | 49.9 | 0.1 | 500 | | Measurement was infeasible on account of cracks formed in molded part | | |

TABLE 2

| | Composition | | | Resistance against ejection of injection-molded article (Kg/cm$^2$) | Mold shrinkage (%) | Flexural strength (kg/cm$^2$) | Flexural (kg/cm$^2$) | Heat deflection temperature (°C.) |
|---|---|---|---|---|---|---|---|---|
| | Polysulfone | Glass fiber | Fluororesin | | | | | |
| Example 6 | 40 | 55 | 5 | 120 | 0.1 | 1000 | 135,000 | 185 |
| Example 7 | 50 | 45 | 5 | 95 | 0.2 | 1100 | 110,000 | 182 |
| Example 8 | 70 | 25 | 5 | 70 | 0.3 | 1200 | 100,000 | 180 |
| Example 9 | 50 | 49 | 1 | 100 | 0.2 | 1150 | 125,000 | 185 |
| Example 10 | 50 | 40 | 10 | 85 | 0.2 | 1050 | 105,000 | 183 |
| Comparative Example 6 | 100 | 0 | 0 | 230 | 0.7 | 1100 | 26,500 | 174 |
| Comparative Example 7 | 90 | 5 | 5 | 60 | 0.6 | 1100 | 27,000 | 175 |
| Comparative Example 8 | 10 | 85 | 5 | | | Molding was infeasible | | |
| Comparative Example 9 | 50 | 20 | 30 | 65 | 0.5 | 500 | 70,000 | 180 |
| Comparative Example 10 | 50 | 49.9 | 0.1 | 450 | | Measurement was infeasible on account of cracks formed in molded part | | |

The following have been revealed from the above examples and comparative examples.

The compositions according to the present invention are improved in heat resistance and stiffness (flexural modulus) as compared with the conventional aromatic polysulfone resin compositions, and exhibit high strength and additionally low mold shrinkage and good mold releasability (Examples 1 to 10).

The tested compositions except those of this invention do not have the intended good properties, as those (Comparative Examples 2 and 7) have been improved insufficiently in mold shrinkage, those (Comparative Examples 4 and 9) have much lowered strength, and those (Comparative Examples 5 and 10) are unsatisfactory in mold releasability.

What is claimed is:

1. An aromatic polysulfone molding resin composition consisting essentially of 20 to 80% by weight of an aromatic polysulfone, 10 to 70% by weight of wollastonite, and 0.5 to 20% by weight of a fluororesin, wherein the combined content of wallastonite with the fluororesin is 20 to 80% by weight based on the total weight of the composition.

2. The resin composition of claim 1, wherein the aromatic polysulfone is a polyarylene compound in which arylene units together with ether linkages and with sulfone linkages are arranged orderly or disorderly.

3. The resin composition of claim 1, wherein the aromatic polysulfone has the structures:

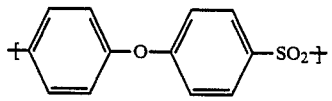
(1)

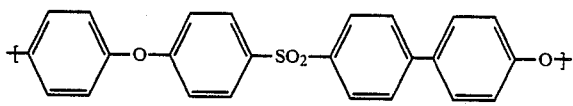
(2)

or

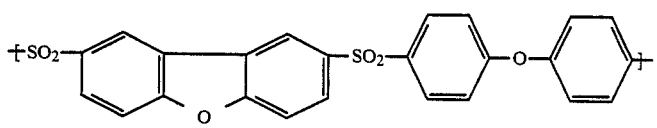
(3)

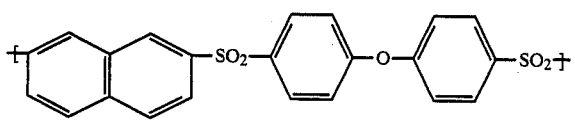
(4)

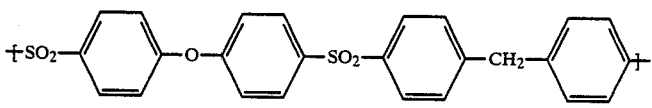
(5)

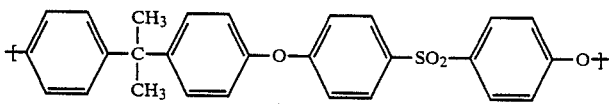
(6)

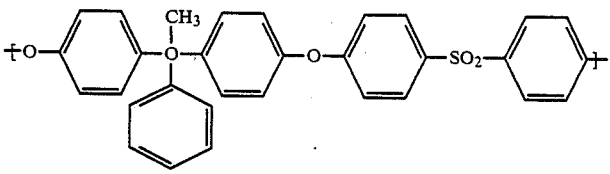
(7)

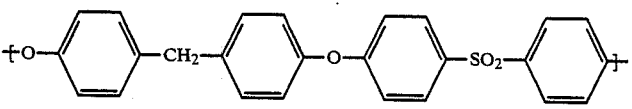
(8)

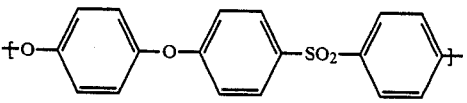
(9)

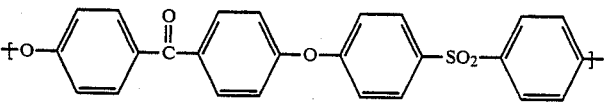
(10)

-continued

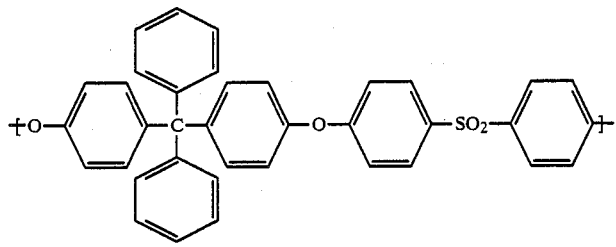
(11)

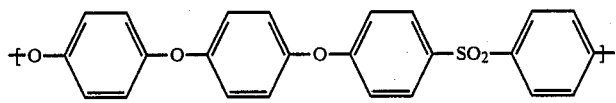
(12)

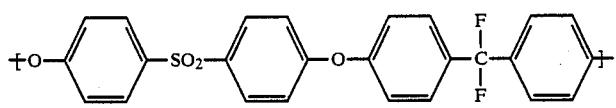
(13)

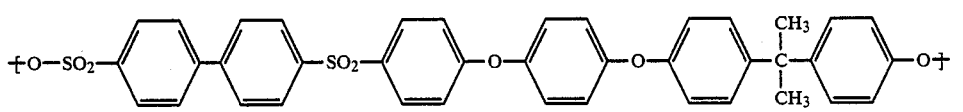
(14)

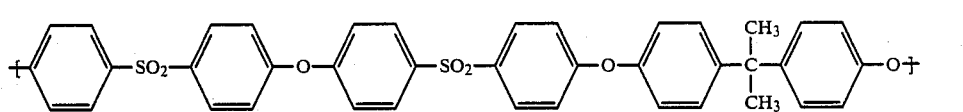
(15)

or

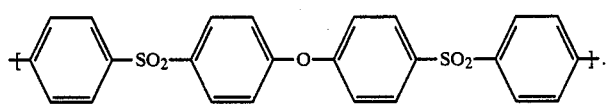
(16)

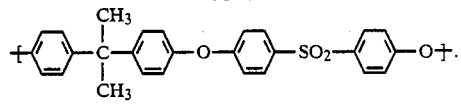
(6)

4. The resin composition of claim 1, wherein the aromatic polysulfone has the structure:

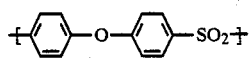
(1)

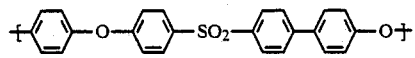
(2)

or

5. The resin composition of claim 1, wherein the reduced viscosity of the aromatic polysulfone is 0.3 to 0.6 as determined at 25° C. on a 1 W/V % solution of the polymer in dimethylformamide.

6. The resin composition of claim 1, wherein the wallastonite has been treated with a surface treating agent.

7. The resin composition of claim 1, wherein the fluororesin is tetrafluoroethylene resin, tetrafluoroethylene-perchloroalkyl vinyl ether copolymer resin, tetrafluoroethylene-hexafluoropropylene copolymer resin, tetrafluoroethylene-ethylene copolymer resin, chlorotrifluoroethylene resin, or vinylidene fluoride resin.

8. The resin composition of claim 7, wherein the fluororesin is tetrafluoroethylene resin.

* * * * *